US012664388B2

(12) United States Patent
De Baer et al.

(10) Patent No.: US 12,664,388 B2
(45) Date of Patent: Jun. 23, 2026

(54) AUTOMATIC MEDIA COLOR PROFILE IDENTIFICATION

(71) Applicant: Fiery, LLC, Fremont, CA (US)

(72) Inventors: Dirk De Baer, Berchem (BE); Mario Kuehn, Duisburg (DE)

(73) Assignee: FIERY, LLC, Fremont, CA (US)

( * ) Notice: Subject to any disclaimer, the term of this patent is extended or adjusted under 35 U.S.C. 154(b) by 290 days.

(21) Appl. No.: 18/527,165

(22) Filed: Dec. 1, 2023

(65) Prior Publication Data

US 2025/0181865 A1    Jun. 5, 2025

(51) Int. Cl.
G06K 15/02 (2006.01)
G06K 15/00 (2006.01)

(52) U.S. Cl.
CPC ......... G06K 15/027 (2013.01); G06K 15/407 (2013.01)

(58) Field of Classification Search
None
See application file for complete search history.

(56) References Cited

U.S. PATENT DOCUMENTS

| | | | |
|---|---|---|---|
| 8,412,055 B2 | 4/2013 | Chandu et al. | |
| 9,420,146 B2 | 8/2016 | Kuehn | |
| 11,323,593 B1 | 5/2022 | Morales | |
| 2015/0363145 A1* | 12/2015 | Kielland | G06K 15/027 |
| | | | 358/1.6 |
| 2017/0253063 A1* | 9/2017 | Schuppan | G06Q 30/0283 |
| 2019/0089868 A1* | 3/2019 | Nakahara | H04N 1/6033 |
| 2023/0328193 A1* | 10/2023 | Roy Biswas | H04N 1/6033 |
| | | | 358/1.9 |
| 2024/0095480 A1* | 3/2024 | Roy Biswas | H04N 1/605 |

FOREIGN PATENT DOCUMENTS

| | | | |
|---|---|---|---|
| CN | 102019775 A | | 4/2011 |
| JP | 2007134935 A | | 5/2007 |
| JP | 2013198079 A | * | 9/2013 |
| WO | 2021154261 A1 | | 8/2021 |

OTHER PUBLICATIONS

Mokrzycki et al., "Color difference Delta E—A survey", In: Machine Graphics and Vision, Apr. 2011, [online] [shortened pp. 1-2, 18-20] (Year: 2011).*
Ukishima Masayuki, JP-2013198079-A English Translation (Year: 2013).*
Mokrzycki et al., Colour difference _E—A survey, In: Machine Graphics and Vision, Apr. 2011, [online] [shortened pp. 1-2, 18-20], retrieved Nov. 24, 2024, Retrieved from Internet URL: https://www.researchgate.net/publication/236023905.
Green, Phil , et al., "Color Management: Understanding and Using ICC Profiles", Wiley-IS&T published 2010, ISBN: 978-0-470-05825-1, entire document.

* cited by examiner

*Primary Examiner* — Miya J Cato
(74) *Attorney, Agent, or Firm* — PERKINS COIE LLP

(57)    ABSTRACT

Color profiling a media for a printer is a tedious and time-consuming process. Embodiments of the invention avoid the need for unnecessary color calibration and profiling by making use of similarities in color rendering that exist between various printers and their color behavior on a media, as well as the similarity of substrates. In this way, embodiments of the invention avoid the need to create output profiles when a system is already equipped with an adequate profile. This allows average users to get adequate quality color reproduction faster for less demanding day-to-day print runs.

30 Claims, 3 Drawing Sheets
(2 of 3 Drawing Sheet(s) Filed in Color)

AUTOMATIC MEDIA COLOR PROFILE IDENTIFICATION

FIELD

Various of the disclosed embodiments concern automatic media color profile identification.

BACKGROUND

An individual and specific color profile is made for each of the media that a printer can use. To do this a sampling of a wide range of colors is printed and subsequently measured with a color measuring device. These measurements are then processed to derive a precise description for the color behavior of the printer for the media in question. Unfortunately, color profiling media for a printer is a tedious and time-consuming process. Further, the fresh calibration and profile creation process is not only time intensive it also requires the use of ink, toner, and media. It would be advantageous to provide a technique that avoids unnecessary printing, while saving ink, toner, and media.

SUMMARY

Embodiments of the invention avoid the need for unnecessary color calibration and profiling by making use of similarities in color rendering that exist between various printers and their color behavior on a particular media, as well as the similarity of substrates. In this way, embodiments of the invention do not require the creation of output profiles when a system is already equipped with an adequate profile. This allows average users to get adequate quality color reproduction faster for less demanding day-to-day print runs.

BRIEF DESCRIPTION OF THE DRAWINGS

This patent or application contains at least one drawing executed in color. Copies of this patent or application publication with color drawing(s) will be provided by the Office upon request and payment of the necessary fee.

DETAILED DESCRIPTION

Embodiments of the invention provide a method and apparatus that avoid the need for unnecessary color calibration and profiling by making use of similarities in color rendering that exist between various printers and their color behavior on a media, as well as the similarity of the substrates. In particular, embodiments of the invention determine if a calibration and profile, created for a different substrate, printer setup, etc., can be used for a good color reproduction in the current set. Multiple colorimetrical parameters can be used to make that determination. Embodiments of the invention compare actual measurements of a certain set of patches with previous results or the predictions of previous results. Deviations between the measurements and the previous results or predictions are multiplied with specific weight factors and summed up to one quality parameter. This parameter is used to compare various calibration and profiles with each other. Based on this comparison the customer or the software can define the best match and if this best match is good enough for the requested printing quality. In cases where a specific combination of ink/toner values was not printed before the ICC media profile can be used to calculate the CIE Lab response of a certain recipe composition.

Figure 1:
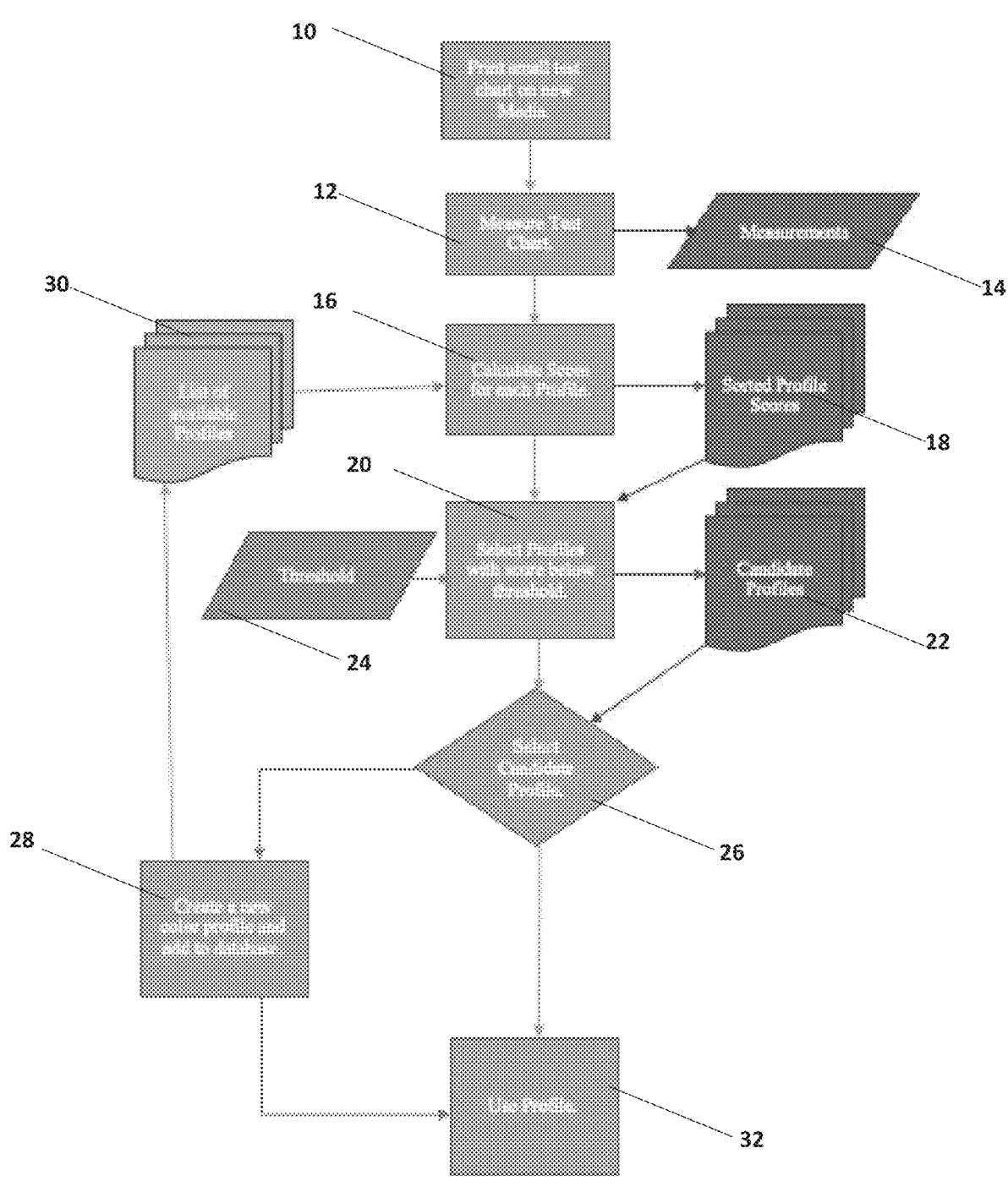
FIG. 1 is a flow diagram that shows an automatic media color profile identification technique according to the invention.

FIG. 1 is a flow diagram that shows an automatic media color profile identification technique according to the invention.

When a new paper is placed in a printer's tray, the user may start a calibration and profiling procedure. The steps in this procedure, according to embodiments of the invention comprise:

1. A small test target is printed (10) and, because it is small, it is quickly measured (12). In embodiments of the invention a small test target can be anything from one patch per color+media white, where five is therefore the smallest patch set for a CMYK printer. More patches produce better results for a more accurate determination and embodiments of the invention can use more than a minimal number of test targets. The patch pattern is printed on the new, unknown media with the new, not calibrated, and profiled conditions. Table 1 shows a sample file for such a reduced patch pattern for the media family.

TABLE 1

REDUCED PATCH PATTERN FOR A MEDIA FAMILY

```
CGATS.17
ORIGINATOR  "FieryMeasure"
FILE_DESCRIPTOR  "21 Random"
CREATED  "2023-07-17 17:34:02"
INSTRUMENTATION  "X-Rite i1Pro3"
KEYWORD  ILLUMINATION_CONDITION
ILLUMINATION_CONDITION  1
KEYWORD  ISIS_XL_FORMAT
ISIS_XL_FORMAT 0
KEYWORD  LOWRES
LOWRES  0
KEYWORD  PatchSize
PatchSize 0
KEYWORD  ZEBRA_RULER_MODE
ZEBRA_RULER_MODE  1
NUMBER_OF_FIELDS 5
BEGIN_DATA_FORMAT
SAMPLE_ID CMYK_C  CMYK_M  CMYK_Y  CMYK_K
END_DATA_FORMAT
NUMBER_OF_SETS 13
BEGIN_DATA
```

| SAMPLE_ID | CMYK_C | CMYK_M | CMYK_Y | CMYK_K |
|---|---|---|---|---|
| 1 | 0.00 | 0.00 | 0.00 | 0.00 |
| 2 | 100.00 | 0.00 | 0.00 | 0.00 |
| 3 | 0.00 | 100.00 | 0.00 | 0.00 |
| 4 | 0.00 | 0.00 | 100.00 | 0.00 |
| 5 | 0.00 | 0.00 | 0.00 | 100.00 |
| 6 | 50.00 | 0.00 | 0.00 | 0.00 |
| 7 | 0.00 | 50.00 | 0.00 | 0.00 |
| 8 | 0.00 | 0.00 | 50.00 | 0.00 |
| 9 | 0.00 | 0.00 | 0.00 | 50.00 |
| 10 | 33.00 | 0.00 | 0.00 | 0.00 |
| 11 | 0.00 | 33.00 | 0.00 | 0.00 |
| 12 | 0.00 | 0.00 | 33.00 | 0.00 |
| 13 | 0.00 | 0.00 | 0.00 | 33.00 |

END_DATA

Embodiments of the invention use the measured results to determine if there is already a profile describing this color behavior well enough. The patch pattern could be a linearization test chart that only has variations of single-color patches. However, at least one patch should be without any ink or toner so that the color of the print media itself is measured. The measurement can be made, for example, with a spectrophotometer, such as for example the ES3000, colorimeter, or any capturing device, including a scanner or camera, that allows derivation of a colorimetric interpretation of surface color, applied by the user. The measurement is saved (14). In embodiments of the invention this measurement is saved to a local folder or other form of persistent storage such as, for example, a database. It is necessary for this routine. Afterwards it can be deleted or saved further.

2. Based on these measurements a search is started in a database of existing media color profiles (30), where for each profile a score is calculated (16) that is based on the measurements of step 1. above and the color characteristics described by the profile. In embodiments of the invention the score can be a weighted score. In embodiments of the invention the search is performed on the DFE. There is a database of profiles and calibration, and this is used to detect if there is already any calibration and profile which describes this color behavior adequately. The database can also be in the cloud. In such case there is a set of calibration and profiles for the current printer. This herein disclosed technique uses the newly captured data and compares it with the color data from the calibration and profiles within the cloud.

3. The procedure returns a list of selected (20) candidate color profiles (22), that are sorted in score order (18) and that have a score below a predefined threshold (24). In embodiments the scores can be sorted in either increasing or decreasing order 4. The user picks a candidate color profile from the list (26) and starts using it (32). Alternatively, if the list is empty or the user wants high precision color the user proceeds with a complete profiling procedure (28). In other embodiments of the invention, the choice of a candidate color profile can also be made by a software program, a specific application, or an AI model.

Many parameters define the output of a printer, e.g. the printing speed, the halftoning, and many more. Even if the substrate is the same, to achieve the maximum output quality it might be necessary to newly profile the same substrate when using a different printing mode. The user cannot see if this is a requirement or not. This invention resolves the problem where a user otherwise would start a fresh profiling process because he does not know whether a new profile is required. Rather, based on the very few data collected in the first step, embodiments of the invention check if a media profile exists that delivers the required printing quality, if such a profile exists, there is no need to generate a new profile. Further, the user gains safety for the production process by reliably reproducing desired colors, while also saving, e.g. time, substrate, ink, and toner.

Alternative embodiments of the invention can also be used to pick suited calibration sets, calsets. Every DFE handles calibration differently. Sometimes it is embedded within a profile, sometimes a separate file, part of the profiling process, or an individual process. But in every case, the calibration is used to prepare the printer for the profiling work, make the color output predictable, and make the needed patch pattern measurable.

The calibration process usually requires more than one step. Embodiments of the invention can be used also in the following way:

If an existing calibration+profile is detected that is close but not 100% fitting, the calibration can be reused, and the user makes a fresh media profile on top to get even a better match. This is another option to speed up the color setup process for the user.

Accordingly, only the necessary calibration and profiles are stored on the digital front end (DFE). Duplications are avoided, due to the analysis and the user guidance provided.

An important consideration is that the acceptance criteria differ based on the printing process, the printing product, and the specific customer expectations. Embodiments of the invention dynamically adapt the tolerance allowance, based on a parameterization from the outside. In embodiments of the invention outside could be any of many different things, e.g.:

It can be setup in the DFE configuration;

It can be something the press or the DFE is setup during the installation process;

It can be a specific production or quality setting within the DFE which defines this;

It can also be a parameter which the DFE or a certain cloud application determines from the way that the user is using of the press, e.g., what kind of jobs are printed, what kind of other quality parameters are used, etc.

It can be a corporate wide setting to make sure all printers in a production environment behave similarly.

If, within a certain production environment, less stringent quality expectations are set, the weighted score discussed above delivers a substrate with wider deviation as a solution. Opposite to this, if color accuracy is a more dominant factor, the same routine can be trimmed to deploy a more restrictive approach.

EXAMPLE

Suppose a printer's database has the following list of five color profiles:

6200.icc (Printer Model 6200 Profile),
4250.icc (Printer Model 4250 Profile),
8245.icc (Printer Model 8245 Profile),
8246.icc (Printer Model 8246 Profile), and
4245.icc (Printer Model 4245 Profile).

Figure 2:
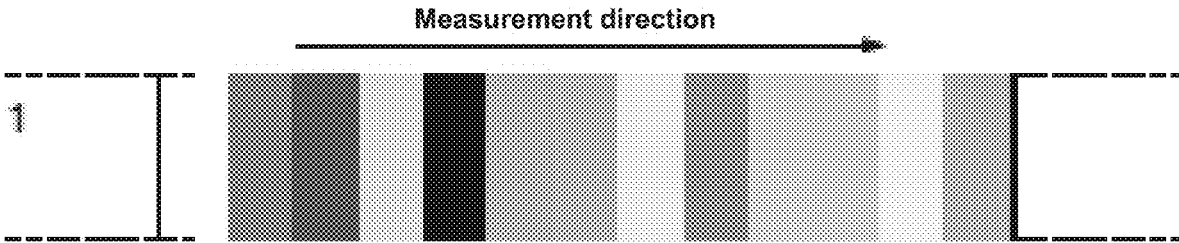
FIG. 2 is a small patch pattern that includes five patches and a patch with 50% and 33% for each color.

A small test chart, printed on a new media by certain printer is subsequently measured with a color spectrophotometer. The samples measured have at least values for blank media and patches with 100% pure cyan, magenta, yellow, and black. As noted above, 100% values from each colorant+media white is the minimum. More is possible. FIG. 2 is a small patch pattern that includes five patches and a patch with 50% and 33% for each color. As noted, additional patches in FIG. 2 are optional but improve the accuracy of the prediction.

These measurements, expressed colorimetrically in the CIELAB color space, also referred to as L*a*b*, are collected in a list:

Measurement List:

White: Labw
100% Cyan: Labc
100% Magenta: Labm
100% Yellow: Laby
100% Black: Labk Those skilled in the art will appreciate that other color spaces may be used, such as:

CMYKO (Orange);
CMYKOV (Orange and Violet);
CMYKRGB (Red, Green and Blue);
CMYKOGV (Orange, Red, Violet);
and others.

Next, for each of the profiles in the printer's database a score is calculated that expresses how well the profile predicts the measurements in the above list. This score is based on the difference between the L*a*b* value predicted by the profile for each of the patches in the above list and the actual measured L*a*b* values. For example, profile 6200.icc might predict for white that the L*a*b* value should be Labw, 6200. This gives a color difference, calculated with the standard ΔE00 formula ΔE00 formula (See Vienna, CIE Publication No. 142-2001, Central Bureau of the CIE) for perceived color difference, for each of the five patches mentioned in the list above:

White Difference: ⌷⌷ ΔE00 (Labw, Labw, 6200)
Cyan Difference: ⌷⌷ ΔE00 (Labc, Labc, 6200)
Magenta Difference: ⌷⌷ ΔE00 (Labm, Labm, 6200)
Yellow Difference: ⌷⌷ ΔE00 (Laby, Laby, 6200)
Black Difference: ⌷⌷ ΔE00 (Labk, Labk, 6200)

These five color differences are subsequently weighted and summarized in one value to derive a single matching score for the profile 6200.icc. Suppose there are five different dE00 values: dE1, dE2, dE3, dE4 and dE5. To each of these values a weight is assigned w1, w2, w3, w4 and w5. The weights indicate how important a difference is. For example, one might give the first value a weight of 2, and the other four values a weight of 1 to indicate the first value is of higher importance.

To get to one value one calculates the following:

$$s = (w1 - dE1 + w2*dE2 + w3*dE3 + w4*dE4 + w5*dE5)/$$

$$(w1 + w2 + w3 + w4 + w5)$$

Because dE1 has a higher weight its contribution to the result is higher than the other values. The division is a normalization to turn the sum into a value of the same range as dE.

Note that the use of weights in this way is one way of deriving a single value. Another way could be to pick the highest or lowest value, or not use a sum but a product.

This weight depends on the kind of patch the difference is for. In embodiments of the invention, white gets a higher weight in the score than other patches to signify it is more important that the profile predicts white well.

This score calculation is repeated for each profile in the database. This might yield, for example:

Score for 6200.icc=1.05
Score for 4250.icc=1.93
Score for 8245.icc=2.16
Score for 8246.icc=2.45
Score for 4245.icc=2.94

The list is sorted from low score to high on purpose, a low score being the best. In this case it shows that 6200.icc is the best suited candidate profile to use on the new media. In other embodiments a different score may be developed that indicates the best suited candidate profile.

The last decision to make is to decide whether a score is good enough. For this a threshold is selected that depends on the intended goal of printing. For a high-quality print, it might be decided that a score of 1.5 is required, while for regular day to day printing a score of 4 is deemed good enough. In the first case the first profile is the only one that qualifies, while in the second case any one of the profiles in the database can be used. What is "good enough" is based on operator experience and expectations for the print. Some print jobs, such as for example an art book or glossy advertisement, must have accurate color and a low score is required because color must be faithfully printed. Other jobs, such as flyers or warehouse carbon boxes, use color only to quickly convey a message and color accuracy is not a concern. In these cases, a high score is sufficient.

Computer Implementation

Figure 3:
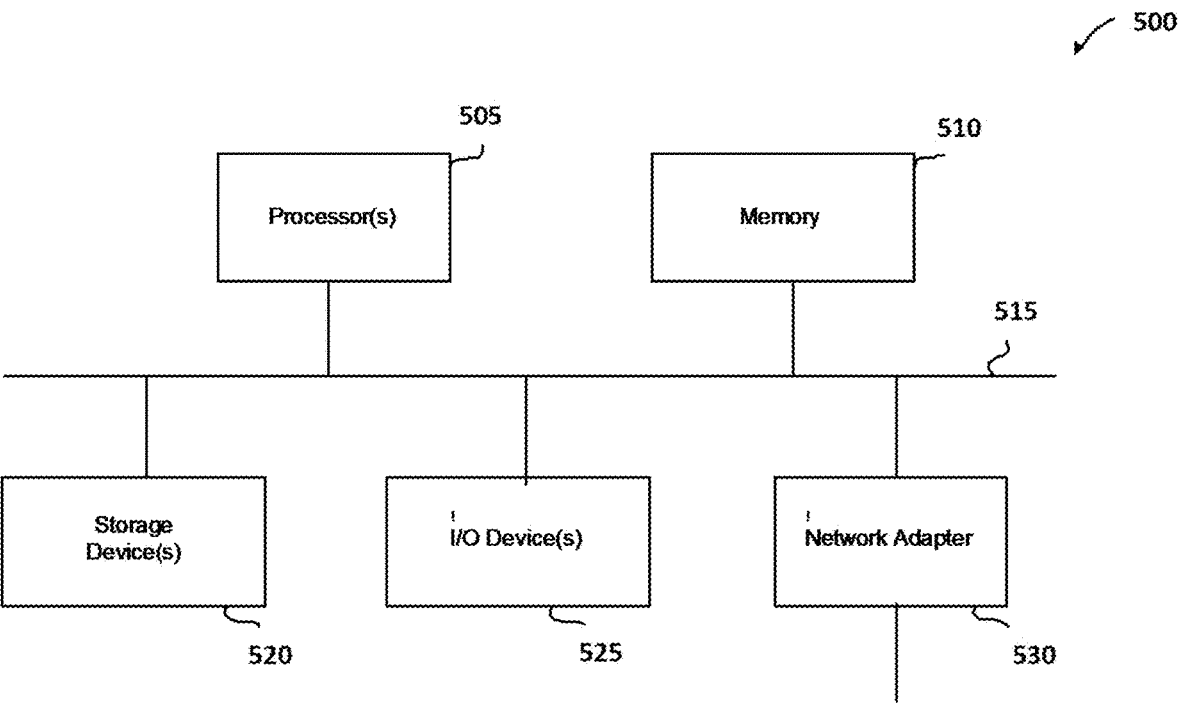
FIG. 3 is a block diagram of a computer system that may be used to implement certain features of some of the embodiments.

FIG. 3 is a block diagram of a computer system that may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g. keyboard and pointing devices, touch devices, display devices, storage devices 320, e.g. disk drives, and network adapters 330, e.g. network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 310 and storage devices 320 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g. via network adapter 330.

The various embodiments introduced herein can be implemented by, for example, programmable circuitry, e.g. one or more microprocessors, programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

The language used in the specification was chosen for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A method for automatic media color profile identification, comprising:

selecting a media for use in printing on a selected printer for which a specific media color profile does not exist;

executing a calibration and profiling procedure to identify similarities in color rendering between said printer and other printers, color behavior of media on said other printers, similarity of said media with other media by:

printing a test target on said selected media;

measuring the printed test target, wherein the test target comprises a plurality of patches;

saving said printed test target measurement;

based on said test target measurement, searching a database of existing media color profiles in said selected printer;

for each of said existing color media profiles calculating a score, wherein said score is based on a difference between said test target measurement for each of the plurality of patches and on characteristics of said existing media color profiles, and wherein said score is a weighted score depending on a difference for each of the plurality of patches;

returning a list of selected candidate media color profiles, wherein said selected candidate media color profiles are sorted in score order; and selecting and applying a candidate color media profile from the list as a media color profile for said selected media on said selected printer;

wherein application of said selected candidate color media profile in said selected printer for said selected media makes it unnecessary to create additional color media profiles in said selected printer for said selected media.

2. The method of claim 1, wherein said selected candidate media color profiles have a score within a predefined required printing quality threshold.

3. The method of claim 1, further comprising:

based on said test target measurement determining whether there is an existing media color profile on said selected printer within said predefined required printing quality threshold.

4. The method of claim 1, wherein said test target comprises a linearization test chart comprising variations of single-color patches.

5. The method of claim 4, wherein at least one of said patches does not contain any ink or toner to allow the color of the print media itself to be measured.

6. The method of claim 1, wherein said measurement is made with a measuring device that allows derivation of a colorimetric interpretation of an applied surface color.

7. The method of claim 6, wherein said measurement is made with any of a spectrophotometer, colorimeter, densitometer, scanner, or camera.

8. The method of claim 1, further comprising:

proceeding with a complete profiling procedure when said list of selected candidate media color profiles is empty or when high precision color is required.

9. The method of claim 1, wherein printer output is defined by any of printing speed and halftoning.

10. The method of claim 1, further comprising:

newly profiling said selected media when using a different printing mode on said selected printer to achieve maximum output quality.

11. The method of claim 1, further comprising:

storing only necessary calibration and profiles on a digital front end (DFE) associated with said selected printer.

12. The method of claim 1, wherein acceptance criteria for a color media profile differ based on printing process, printing product, and specific customer expectations.

13. The method of claim 1, further comprising:

dynamically adapting tolerance allowance based on an outside parameterization.

14. The method of claim 13:

wherein when less stringent quality expectations are set, the weighted score delivers a color media profile for a media having a wider deviation from said selected media; and wherein when color accuracy is a more dominant factor, the weighted score delivers a color media profile for a media having a lesser deviation from said selected media.

15. The method of claim 1, wherein said test target measurement have at least values for blank media and patches with 100% of each printer colorant.

16. The method of claim 15, wherein said printer colorants comprise pure cyan, magenta, yellow, and black.

17. The method of claim 16, further comprising:

sorting said score on said list from low score to high, wherein a low score is a best candidate color media profile score.

18. The method of claim 16, further comprising:

sorting said scores on said list from low score to high, wherein a high score is a best candidate color media profile score.

19. The method of claim 1, wherein said test target measurements are expressed colorimetrically in the CIELAB color space and collected in a measurement list.

20. The method of claim 1, wherein said test target measurements are expressed spectrally.

21. The method of claim 1, further comprising:

calculating a prediction score that expresses how well the color media profile predicts the measurements for each of the patches in a said measurement list of test target measurements for each of said color media profiles in a printer color media profile database.

22. The method of claim 21, wherein said prediction score is based on a prediction difference between a L*a*b* value predicted by a color media profile for each of the patches in said measurement list and actual measured L*a*b* values for said test target.

23. The method of claim 22, further comprising:

calculating a color difference with the standard $\Delta E2000$ formula for perceived color difference for each of the patches in said measurement list.

24. The method of claim 23, further comprising:

weighting and summarizing said color differences for said patches in said measurement list in one value to derive a single matching score for a color media profile.

25. The method of claim 24, wherein said weight depends on the color difference for each particular patch.

26. The method of claim 25, wherein white receives a different weight than other patches to signify it is more important that the color media profile predicts white well.

27. The method of claim 24, further comprising:

repeating a score calculation for each color media profile in said color media profile database.

28. The method of claim 21, wherein said prediction score is based on how well a profile matches the printed test target measurements.

29. The method of claim 1, further comprising:

selecting said threshold based on an intended printing goal;

wherein for a high-quality print a lower score is required, and a limited subset of available existing color media profiles is acceptable; and wherein for regular print a higher score is adequate and any of said existing color media profiles is acceptable.

30. The method of claim 1, further comprising:

using said method to select calibration sets, calsets for said selected media on said selected printer.

* * * * *